United States Patent [19]

Ikari et al.

[11] 4,163,715

[45] Aug. 7, 1979

[54] METHOD FOR TREATMENT OF WASTE WATER

[75] Inventors: Yoshikatsu Ikari, Narashino; Shiyoichiro Yokoyama, Musashimurayama; Keisuke Katoh, Hiratsuka, all of Japan

[73] Assignees: Agency of Industrial Science & Technology; Sumitomo Jukikai Envirotech, Inc., both of Tokyo, Japan

[21] Appl. No.: 838,973

[22] Filed: Oct. 3, 1977

[30] Foreign Application Priority Data

Oct. 5, 1976 [JP] Japan ................. 51/119614

[51] Int. Cl.² ............................................. C02B 1/14
[52] U.S. Cl. ..................................... 210/28; 210/33; 210/40
[58] Field of Search ................. 162/29; 210/28, 30 R, 210/33, 34, 40, 46, 51–54, 47, 45; 252/416, 419, 417, 418; 423/635–637

[56] References Cited

U.S. PATENT DOCUMENTS

| 3,117,839 | 1/1964 | Dell | 423/637 |
|---|---|---|---|
| 3,409,545 | 11/1968 | Albertson | 210/46 |
| 3,960,648 | 6/1976 | Nakajima et al. | 162/29 |
| 3,998,731 | 12/1976 | Franzen et al. | 210/40 |
| 4,008,161 | 2/1977 | Wong et al. | 210/40 |
| 4,019,952 | 4/1977 | Ploetz et al. | 210/40 |
| 4,019,982 | 4/1977 | Ikari et al. | 210/30 R |

FOREIGN PATENT DOCUMENTS 1080383  8/1967  United Kingdom ............ 210/54

*Primary Examiner*—Charles N. Hart
*Assistant Examiner*—Ivars Cintins
*Attorney, Agent, or Firm*—Armstrong, Nikaido, Marmelstein & Kubovcik

[57] ABSTRACT

In removing color components and COD components from waste water, the waste water is treated with an inorganic adsorbent, the mixture thus obtained is subjected to a sedimentation treatment to separate the adsorbent adsorbed the color and COD components as a slurry layer, and a portion of the adsorbent slurry is returned to the adsorption step and the remainder thereof is subjected to a regenerating treatment to recycle as an adsorbent.

Pollution-free water is effectively obtained by the above method.

6 Claims, 1 Drawing Figure

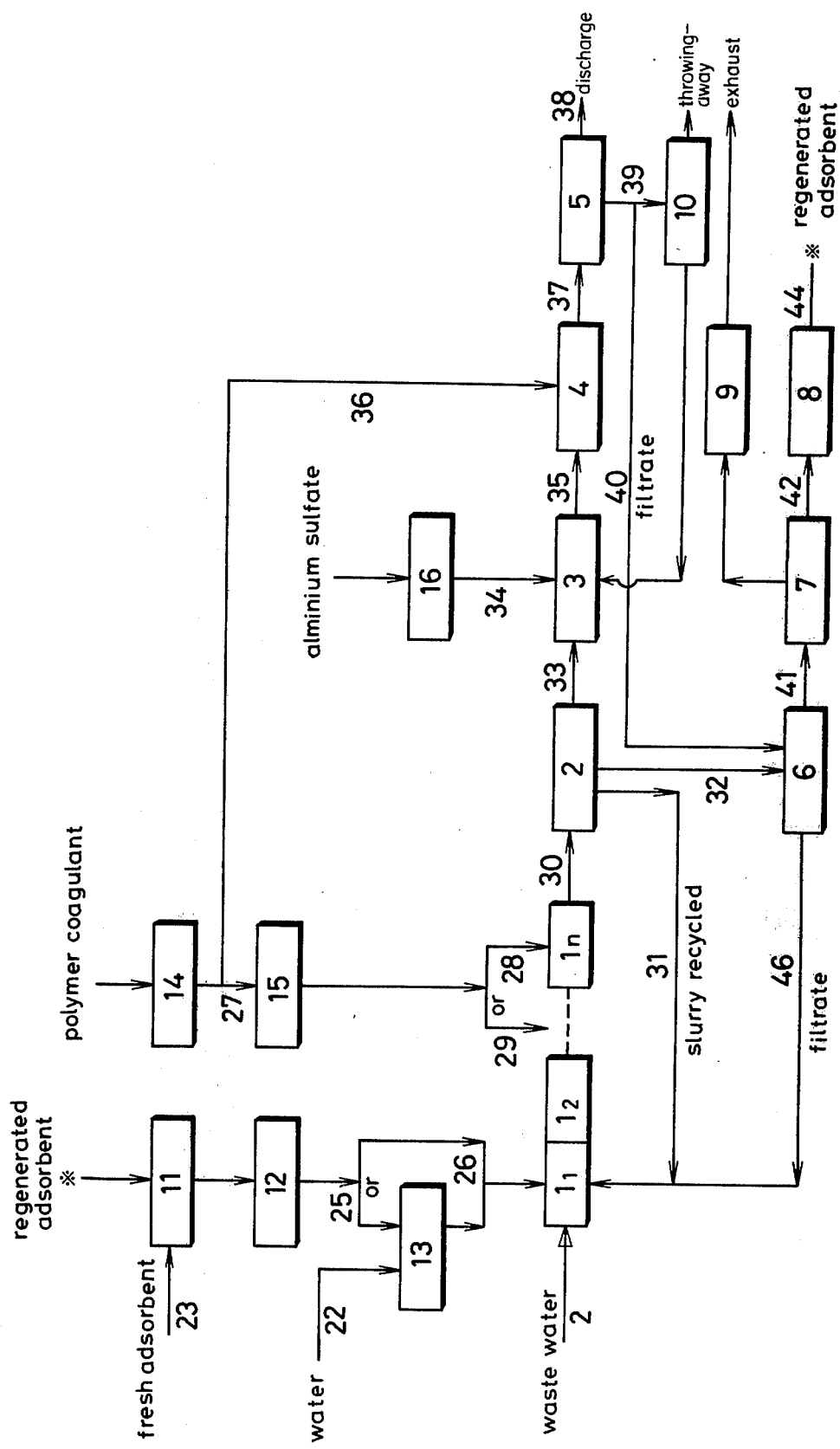

METHOD FOR TREATMENT OF WASTE WATER

BACKGROUND OF THE INVENTION

Hereinbefore, there have been proposed various methods for treating waste water, in which waste water is converted to pollution-free water by removing the color and COD components from the waste water. Among them, massive-lime method and coagulation methods using coagulants, such as aluminium salts, iron salts or magnesium salts, have been known as relatively effective methods. However, such coagulation methods have such disadvantages that the removal of color and COD components from waste water is not sufficient and the sedimentation properties of produced flock is bad. One of the most serious problems in such coagulation methods is a problem of treatment of produced sludge. In the coagulation methods, the coagulant is separated as a sludge containing pollutant. The sludge thus obtained is of a poor dehydration property and very difficult to handle. When burning up, the cost is very expensive, and when dumping, the places therefor are restricted in view of secondary pollution.

An object of the present invention is to overcome such disadvantages of conventional methods.

Another object of the present invention is to provide a novel method for treating waste water in which the color and COD components are effectively removed and sludge is not substantially produced or, if any, the amount thereof is a little.

A further object of the present invention is to provide a novel method for treating waste water in which the treatment of waste water using inorganic adsorbent is conducted more effectively and economically.

Other objects and advantages of the present invention will more clearly appear from the following description.

SUMMARY OF THE INVENTION

The objects of the present invention are attained by the following method.

According to the present invention, color components and COD components are removed from waste water by the method comprising:

(a) a step in which the waste water is mixed with inorganic adsorbent powder to adsorb the color components and the COD component contained in the waste water into the adsorbent powder;

(b) a step in which the mixture thus obtained is subjected to a sedimentation treatment to separate the adsorbent powder absorbed the color and the COD components as a slurry layer;

(c) a step in which water of the upper layer is discharged from the step (b);

(d) a step in which the adsorbent slurry of the lower layer is taken out of the step (b);

(e) a step in which a portion of the adsorbent slurry taken out is returned to the adsorption step (a);

(f) a step in which the remainder of the adsorbent slurry taken out is subjected to a dehydration treatment;

(g) a step in which the dehydrated adsorbent is calcined to be regenerated; and (h) a step in which the regenerated adsorbent is recycled into the adsorption step (a).

PREFERRED EMBODIMENT OF THE INVENTION

Various kinds of waste water having chromaticity or colored components and COD components may be applied to the method of the present invention. For instance, waste pulp water, waste fermentation water, treated sewage, waste water from factories and the like may be preferably applied.

According to the present invention, inorganic adsorbent is essentially used to remove the chromaticity and the COD components.

As the inorganic adsorbent, various kind inorganic adsorbents which can be regenerated by calcination may be used. Especially, magnesia adsorbent, obtained by calcining magnesium compound, which can be converted to magnesia by thermal decomposition, such as magnesium hydroxide, magnesium carbonate or basic magnesium carbonate at a temperature of 400°–700° C., more preferably, 500°–600° C., is preferably used.

Magnesia adsorbent may be used alone or as a mixture with other metal oxide such as alumina, kaolin, ferric oxide or calcium oxide.

Such inorganic adsorbent is used in the form of powder. The grain size is preferably 30–200 mesh, more preferably 60–90 mesh.

In practicing the method of the present invention, firstly, the inorganic adsorbent powder is added and mixed with waste water to be treated. In this case, the inorganic adsorbent powder can be either directly added or added in the form of slurry. In case of adding in the form of slurry, the slurry may be preferably prepared within one (1) hour before using it because some of the inorganic adsorbents tend to lower the adsorption power in the form of slurry.

The amount of the inorganic adsorbent to be added to waste water depends on the sort of waste water and the degree of treatment. Usually, the adding amount of inorganic adsorbent is 1–15 parts by weight, more preferably 3–7 parts by weight to the chromaticity components and the COD components existing in waste water.

Adsorption time depends on the sort of substances to be adsorbed and the sort of adsorbent. Usually 10–60 minutes are sufficient.

The type of adsorption vessel may not be restricted. Usually, cylindrical or other shaped adsorption vessels having moving vanes therein may be preferably used. As the moving vane, an impeller, such as propeller of ship or turbine blade, having $\frac{1}{4}$–$\frac{1}{2}$ length to the diameter of the adsorption vessel may be preferably used. The rotary speed may be adjusted to 100–300 r.p.m.

One or more adsorption vessel may be used. Especially, multi-stage vessels connecting 2–6 vessels in series may be preferably used.

In practicing the adsorption treatment according to the present invention, the inorganic adsorbent is usually used together with one or more conventional coagulants. In case of adding the coagulant, the adding amount may be preferably 1/10,000–1/1,000 part by weight to the inorganic adsorbent. The coagulant may be preferably added, in case of multi-stage adsorption vessels, to the final vessel or the vessel preceding to it. As the coagulants, polymer coagulants may be used.

When the pH of the system in the adsorption vessel is nonionic, cationic coagulants may be preferably used, and when the pH is alkaline (pH 10–11), anionic flocculants such as poly(sodium acrylate) may be preferably used.

In such a manner, the color and COD components existing in waste water are effectively adsorbed into the inorganic adsorbent.

The mixture of the adsorbent and waste water thus obtained is subjected to a sedimentation treatment to separate the adsorbent as a slurry layer from water layer.

Thickener type sedimentation vessel may be preferably used. A sludge collector, rotating at 2–10 m/min. of peripheral speed, may be equipped in the vessel to prevent the adsorbent from solidifying. In this case, the surface area load may be 0.5–2 m/hour.

The slurry thus separated usually has 5–50% by weight of the adsorbent.

A portion of the adsorbent slurry, usually 1–10 parts by weight to the adsorbent to be added, is returned to the adsorption step. In case of multi-stage adsorption vessel, it may be preferably returned to the first stage vessel. The remainder of slurry is transferred to a dehydration step.

According to the present invention, water separated at the sedimentation step can be directly discharged since the color and COD value are very low. However, sometimes a little solid matters (SS) mainly composed of fine inorganic adsorbent may be contained therein. In such a case, further treatments such as coagulation treatment or activated sludge treatment may be conducted.

The coagulation treatment may be conducted in conventional manners. Preferably, a coagulant may be added into water separated from the sedimentation step and the system thus obtained may be rapidly blended (at 100–300 r.p.m. of rotary speed) and slowly blended (at 10–60 r.p.m. of rotary speed) and, then, subjected to a sedimentation treatment in a sedimentation vessel of 0.7–2.0 m/hour of surface area load. Preferable coagulants are aluminium sulfate or an aqueous solution thereof. Also, conventional polymer coagulants may be added thereto.

The addition amount of aluminium sulfate may be preferably 1/10–½ parts by weight (of $Al_2O_3$) to the solid matters (SS) in water. In case of adding the polymer coagulant, 0.5–2 ppm thereof may be preferably added.

In this treatment, SS 30–300 ppm may be lowered to SS 10–50 ppm. In this coagulation treatment, when the system shows alkalinity due to the inorganic adsorbent, the pH may be preferably adjusted to 6.5–7.5 by adding 10–20 ppm (as 98% $H_2SO_4$) of sulfuric acid.

According to the present invention, a portion of the adsorbent slurry separated at the sedimentation step (b) is returned to the adsorption step (a) and the remainder of the adsorbent slurry is subjected to the dehydration treatment.

The amount of remaining adsorbent may accord with the amount of the adsorbent to be added to the adsorption step.

The dehydration treatment may be conducted so as to reduce the water content to 30–70% by weight, more preferably, 30–50% by weight. The dehydration treatment may be conducted either by means of conventional vacuum dehydration or pressure dehydration. The dehydrated adsorbent slurry thus obtained is transferred in the form of cake to a regeneration furnace. The cake like adsorbent is calcined at 400°–750° C., more preferably 500°–650° C. The regenerating calcination may be conducted in air. However, preferably it is conducted in an atmosphere of less oxygen (0–10% by volume of oxygen) for 10–30 minutes at first and then in an atmosphere of enough oxygen (10–25% by volume of oxygen) for 10–30 minutes. The adsorbent may be almost completely regenerated. The adsorbent thus regenerated is recycled to the adsorption step (a) through a cooler and a storage hopper.

BRIEF DESCRIPTION OF THE DRAWINGS

The drawing shows a preferred embodiment of the present invention.

In the drawing, reference characters $1_1$–$1_n$ represent adsorption vessels, 2 being a sedimentation vessel, 3 being a vessel for rapidly blending, 4 being a vessel for slowly blending, 5 being a coagulation vessel, 6 being a dehydration vessel and 7 being a regeneration furnace.

Waste water is introduced into the adsorption vessel 1 through conduit 21. Fresh adsorbent is stored in adsorbent storage vessel 11 by means of suitable transfer means 23, then a suitable amount thereof is introduced into the adsorption vessel 1 in the form of powder by means of automatic supplying means 12. In case of introducing the adsorbent in the form of slurry into the adsoption vessel 1, a suitable amount thereof is introduced from the automatic supplying means 12 through transfer means 25 into slurry vessel 13 into which water is introduced through conduit 22 and the slurry formed therein is introduced into the adsorption vessel 1 through conduit 26.

The adsorbent and waste water introduced into the adsorption vessel is passed through, in turn, the adsorption vessels $1_1$, $1_2$, ... $1_n$ and they are blended in every vessel to adsorb the chromaticity components and the COD components existing in waste water. Into the final adsorption vessel $1_n$ or the previous vessel $1_{n-1}$, polymer coagulant is introduced from hopper 14 through conduits 27 and 28 or 29 as a solution obtained in dissolution vessel 15.

The mixture taken out from the final adsorption vessel $1_n$ is transferred into sedimentation vessel 2, in which a lower layer composed of slurry of adsorbent and an upper layer composed of water are separated. A portion of the absorbent slurry thus separated is returned through conduit 31 into the adsorption vessel 1 and the remainder of the slurry is transferred through conduit 32 into the dehydration vessel 6. Water layer is transferred through conduit 33 into the rapidly blending vessel 3, in which water is blended with aluminium sulfate introduced through conduit 34 from aluminium sulfate tank 16, and transferred through conduit 35 into the slowly blending vessel 4, in which water is slowly blended with polymer coagulant introduced through conduit 36.

Water thus treated is transferred through conduit 37 into the coagulation vessel 5, in which water is separated from coagulated flocks, and discharged through conduit 38. The solid matters taken out from the coagulation vessel 5 is dehydrated by means of dehydration vessel 10 with the filtrate returned to vessel 3 through conduit 45 and the water thrown away.

Accoding to this method, the amount of the solid matters is extremely small as compared with the amount thereof produced in the conventional coagulation treatment only, therefore, the throwing away thereof has no problem and, if necessary, all or a portion thereof may be transferred into the dehydration vessel 6 by means of transfer means 40 to be treated with adsorbent slurry introduced through conduit 32.

As mentioned above, many kinds of waste waters do not need the coagulation step. In such a case, the treatments after 3 in the drawing are not necessary.

In place of the coagulation treatment, conventional activated sludge method may be applied. In this case, conventional apparatuses for activated sludge method, such as aeration vessel and precipitation vessel, may be used.

The dehydrated cake obtained by dehydrating the adsorbent slurry by means of the dehydration vessel 6 is transferred into the regeneration furnace 7 to be calcined at 400°–750° C., more preferably 500°–600° C. and cooled by means of the cooler 8, and the regenerated adsorbent is transferred into the storage vessel 11 by means of transfer means 24.

Exhaust gas may be introduced through conduit 43 into a deodorization furnace 9 to be deodorized and then discharged through conduit 44. The filtrate may be transferred from the dehydration vessel 6 through conduit 46 into the adsorption vessel 1.

The method according to the present invention, as mentioned above, utilizes adsorption principle based on inorganic adsorbent, basically different from the conventional coagulation method, and, therefore, has no serious problem accompanied by production of sludge and treatment of sludge. Also, method according to the present invention shows high removal rates of color or chromaticity and COD components from waste water. For instance, when waste pulp water is treated by the method of the present invention using 5 times by weight of inorganic adsorbent to COD components therein, high removal ratio of chromaticity of about 90–98%, high removal ratio of COD of about 70–85% and high removal ratio of lignin of about 75–85% can be attained. In case of waste water from fermentation industries, also, high removal ratio of COD of about 60–80% and high removal ratio of chromaticity of about 90–95% can be attained.

The method of the present invention may be conducted together with conventional methods. Especially, in case that waste water contains a relatively large amount of substances which may be easily removed by biological treatment, biological treatment such as activated sludge method may be preferably applied before or after the method of the present invention.

The method of the present invention may be preferably applied to pulp and paper mill waste water, waste water from fermentation industries, sewage treated waste water, secondary treated sewage and the like and can highly remove therefrom chromaticity components, COD component, moreover, phosphorus components, detergents such as ABS and the like. The present invention is explained by Example.

EXAMPLE

A: Adsorption and Sedimentation Steps

Into waste water having $COD_{Mn}$ 1100 ppm, chromaticity 3800 ppm, 5000–6000 ppm of inorganic adsorbent (magnesia, 100 mesh) is added and blended in 2-stage adsorption vessel (each of which has an average staying time of 15 minutes). The first-stage adsorption vessel has therein propeller of 295 r.p.m. for ship and the second-stage adsorption vessel has therein same type propeller of 100 r.p.m.

During the procedure, into the second-stage vessel, 2–3 ppm of polymer coagulant [poly(sodium acrylate)] is added. After the adsorption, the adsorbent slurry and water layer is separated by means of precipitation vessel of a surface area load of 1.2 m/hour. The adsorbent slurry thus settled is returned into the adsorption vessel by means of screw pump in the volume of ½ to original water.

As a result, treated water shows $COD_{Mn}$ of 280–160 ppm, chromaticity of 300–80 ppm and SS of 50–150 ppm.

B: Dehydration Step

10–20% by weight of the adsorbent slurry is dehydrated by means of a vacuum type dehydrating machine having a dehydration power of 50–150 kg/m².hour.

The water content is converted to 35–60% by weight.

C: Regeneration Step

The dehydrated sludge is further dehydrated, dried and calcined in a heating furnace having mixing means. During the procedure, organic substances adsorbed thereon are decomposed and the adsorbent is regenerated.

The calcination is conducted at 400°–650° C. for 30 minutes. The atmosphere in the furnace is preferably maintained in reducing state during elevating the temperature and maintained in oxidating state during calcination.

After the regeneration, the properties of the adsorbent is not substantially lowered.

What is claimed is:

1. A method for treating waste water which comprises:
   (a) a step in which the waste water is blended with inorganic adsorbent powder to adsorb chromaticity and COD components contained in the waste water into the adsorbent powder, said adsorbent powder being selected from the group consisting of magnesia alone and magnesia in admixture with another metal oxide, said magnesia in each adsorbent powder being obtained by calcining a compound selected from the group consisting of magnesium hydroxide, magnesium carbonate, basic magnesium carbonate, and mixtures thereof,
   (b) a step in which the mixture of water and adsorbent thus obtained is subjected to a sedimentation treatment to separate the adsorbent powder with adsorbed chromaticity and the COD components as a slurry layer,
   (c) a step in which water of the upper layer is discharged from the step (b),
   (d) a step in which the adsorbent slurry of the lower layer is taken out of the step (b),
   (e) a step in which a portion of the adsorbent slurry taken out is returned to the adsorption step (a),
   (f) a step in which the remainder of the adsorbent slurry taken out is subjected to a dehydration treatment,
   (g) a step in which the dehydrated adsorbent is calcined in a gas containing less than 10% of oxygen for 10–30 minutes and then in a gas containing 10–25% oxygen for 10–30 minutes,
   (h) a step in which the regenerated adsorbent is recycled to the adsorption step (a).

2. Method according to claim 1, in which polymer coagulant is added in an amount of 1/10,000–1/1000 by weight based on total weight of the adsorbent powder to the added inorganic adsorbent powder.

3. A method according to claim 1, in which said inorganic adsorbent powder blended with the waste water comprises fresh adsorbent, regenerated adsorbent and adsorbent in the slurry taken from said step (b).

4. A method according to claim 3 in which the amount of the adsorbent in the slurry taken from the step (b) is within the range of 1 to 10 times the total weight of the fresh adsorbent and the regenerated adsorbent.

5. The method of claim 1 wherein the adsorbent is a mixture of magnesia and another metal oxide obtained by calcining a compound from the group consisting of magnesium hydroxide, magnesium carbonate, basic magnesium carbonate and mixtures thereof and thereafter mixing the calcined product with another metal oxide.

6. The method of claim 1 wherein the adsorbent powder is a mixture of magnesia and another metal oxide obtained by calcining a mixture of a metal oxide and a compound selected from the group consisting of magnesium hydroxide, magnesium carbonate, basic magnesium carbonate and mixtures thereof.

* * * * *